July 23, 1963  C. W. COCHRAN  3,098,273
CONDUIT RETAINER
Filed Sept. 26, 1960
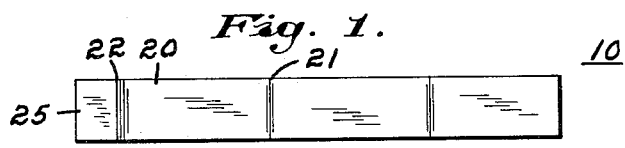
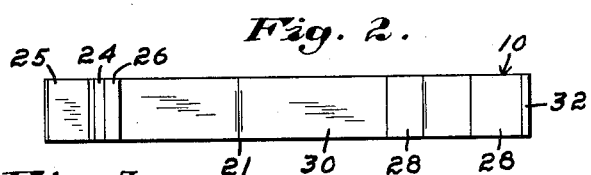
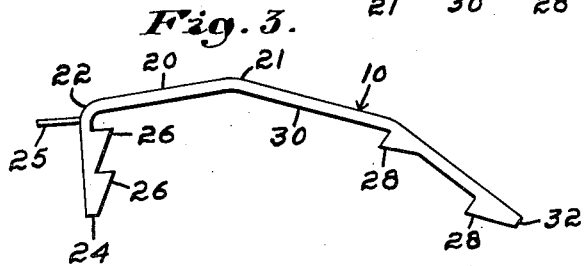
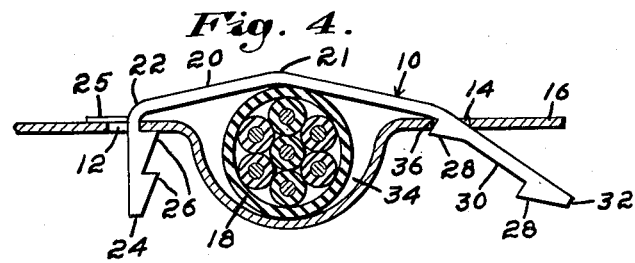
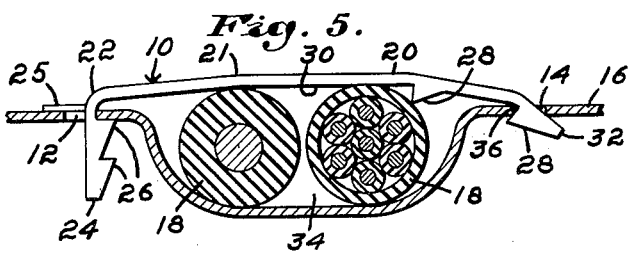
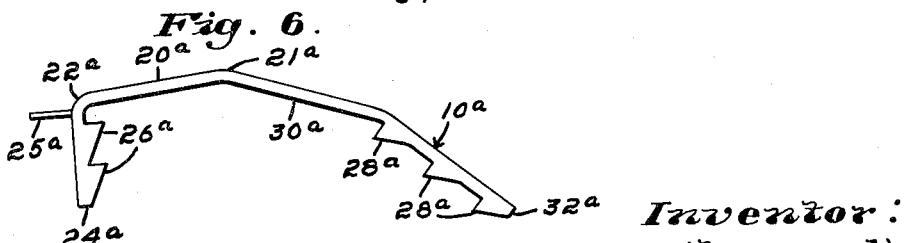
Inventor:
Clarence W. Cochran, (deceased)
by Lois Cochran, Administratrix,
by James B. Tiffany Jr. Atty.

3,098,273
CONDUIT RETAINER
Clarence W. Cochran, deceased, late of Belmont, Mass., by Lois Cochran, administratrix, Belmont, Mass., assignor to United-Carr Fastener Corporation, Cambridge, Mass., a corporation of Delaware
Filed Sept. 26, 1960, Ser. No. 60,246
1 Claim. (Cl. 24—73)

This invention relates generally to a fastener for cables, conduits and the like and more specifically to a wiring fastener for securing wire harnesses or the like in fixed relation to a support.

Recent innovations in automotive construction have resulted in the incorporation of channeled passageways in the body providing a protected area for receiving wire harnesses or the like. Various fastening means have been used to retain the harness within the channels. This invention comprises an improvement over existing fasteners and can be simply and economically molded of plastic or rubber and inserted with a minimum of effort without the use of tools.

Therefore, the object of the invention is to provide a wiring fastener for retaining wire harnesses or the like within a channel passageway.

Another object of the invention is to provide a wiring fastener which can be simply and economically molded from plastic or the like and inserted without the use of tools.

A further object of the invention is to provide a wiring fastener adapted for blind attachment to a suitable support and which may be easily and simply attached without the use of special tools.

The present invention is illustrated by way of example in the accompanying drawings, in which FIG. 1 is a top plan view of the fastener;

FIG. 2 is a bottom plan view of the fastener;

FIG. 3 is a view in side elevation of the fastener;

FIG. 4 is a view in side elevation of the fastener assembled with a panel with one cable retained therein, partly in section;

FIG. 5 is a view similar to FIG. 4 with two cables retained in assembly; and

FIG. 6 is a side elevation of a modified form of the invention.

Reference is now to be had to the drawing wherein an illustrated embodiment of the wiring fastener construction made in accordance with the present invention and generally indicated by the reference numeral 10 is shown. The fastener 10 comprises an elongated strip of plastic or the like adapted for axial insertion within apertures 12 and 14 of a supporting plate 16 to retain a wiring harness and the like 18 in assembly.

The fastener 10 includes a flat strip of a resilient material such as plastic or the like which may be simply and economically molded or extruded. One of the preferred forms of plastic which has been found to have the required characteristics of limited flexibility is a polyamide such as nylon. However, any of the synthetic organic plastics such as cellulose acetate butyrate resins or other polyamides could be adapted for use in the device.

The fastener 10 is a one piece strip preferably having a flat medial surface 20 with an oblique bend 21 substantially at its midpoint and a sharp angular bend 22 adjacent one distal end 24. Extending outwardly at right angles to the bend 22 is a tab member 25, an extension of the medial surface 20. Disposed intermediate the distal end 24 and the bend 22, a plurality of projections 26 are formed for a purpose to be described hereinafter. The strip extends from the bend 22 upwardly out of the plane and then obliquely downward having a second group of projections 28 spaced from each other, disposed along the lower surface 30 and spaced from the other distal end 32.

The plate 16 has a channel 34 formed therein as shown in FIGS. 4 and 5 to provide a recessed area and restrict lateral movement of the wire 18 secured therein.

To assemble the fastener 10, the wiring harness 18 is placed within the channel 34 and one end 32 of the fastener inserted through the aperture 14 so that one of the projections 28 bear against the wall 36 of the aperture 14. The distance between the apertures 12 and 14 is predetermined so that the other end 24 is in axial alignment with the aperture 12. By a continuous downward motion the end 24 will pass through the aperture 12 in the supporting plate 16 until the tab member 25 abuts against the upper surface of the panel. Due to the inherent resiliency of the material used in the fastener the lower surface thereof will bear against the wire harness causing a certain degree of flexing which in turn allows one of the projections 26 to bear against the under side of the panel. It will thus be readily seen that to remove the fastener axial pressure applied to the top surface of the fastener 10 will compress the fastener longitudinally to allow the projection 26 to be in axial alignment with the aperture 12 to permit retrograde withdrawal.

FIG. 6 illustrates a fastener 10a being provided with more projections 28a, then shown in FIG. 3, for the purposes of spanning more groups in number or size of wires. The other similar portions of the fastener 10a are indicated on FIG. 6 as 20a, 21a, 22a, and 24a, 25a and 26a and are the same as disclosed in connection with the device shown in FIG. 3.

Since certain other obvious modifications may be made in this device without departing from the scope of the invention, it is intended that all matters contained herein be interpreted in an illustrative and not in a limiting sense.

I claim:

The combination of a wire fastening device, a relatively thin sheet-like support having at least two spaced apertures and a wire or the like, said wire fastening device comprising a one-piece, continuous, relatively thin, flexible strip of molded plastic material having an inner surface contacting said wire, a first end portion of said strip extending through an aperture formed in said support at substantially a right angle to the plane of a portion of the support and having at least one support engaging projection extending from said inner surface and beyond a face plane of said strip and beyond the aperture in the support thereby engaging said support to anchor said first end portion, said strip having a portion extending from said first end portion over the said wire or the like, and said strip also having a second end portion passing through a second aperture in said support at an acute angle to the plane of a portion of the support and having at least two support engaging projections extending from said inner surface, one of said support engaging projections of said second end portion engaging the support adjacent to said second aperture and located at least partially within the aperture while another projection is spaced laterally therefrom on the strip a distance to be free of interference of engagement with the support thereby to provide for an adjusted second engagement of the wire fastening device to the support when desired.

(References on following page)

References Cited in the file of this patent

UNITED STATES PATENTS

| | | |
|---|---|---|
| 272,469 | Phillips | Feb. 20, 1883 |
| 2,616,142 | Tinnerman | Nov. 4, 1952 |
| 2,723,432 | Flora | Nov. 15, 1955 |
| 2,893,671 | Flora | July 7, 1959 |
| 2,915,267 | Kaysing | Dec. 1, 1959 |
| 2,918,240 | Wiegand | Dec. 22, 1959 |

FOREIGN PATENTS

| | | |
|---|---|---|
| 1,085,952 | France | Aug. 4, 1954 |
| 1,123,839 | France | June 18, 1956 |